United States Patent
Lopez Villegas et al.

(10) Patent No.: US 7,564,929 B2
(45) Date of Patent: Jul. 21, 2009

(54) SYSTEM FOR COHERENT DEMODULATION OF BINARY PHASE SHIFT KEYING SIGNALS (BPSK)

(75) Inventors: Jose Maria Lopez Villegas, Barcelona (ES); Jose Javier Sieiro Cordoba, Barcelona (ES); Joan Aitor Osorio Marti, Barcelona (ES); Josep Ignasi Cairo Molins, Barcelona (ES)

(73) Assignee: Seiko Epson Corporation (JP)

( * ) Notice: Subject to any disclaimer, the term of this patent is extended or adjusted under 35 U.S.C. 154(b) by 616 days.

(21) Appl. No.: 11/343,269

(22) Filed: Jan. 30, 2006

(65) Prior Publication Data

US 2006/0193401 A1 Aug. 31, 2006

(30) Foreign Application Priority Data

Feb. 28, 2005 (EP) .................................. 05075480

(51) Int. Cl.
*H03D 3/22* (2006.01)
(52) U.S. Cl. ........................................ 375/329; 329/304
(58) Field of Classification Search ................. 375/329; 329/304
See application file for complete search history.

(56) References Cited

U.S. PATENT DOCUMENTS

| | | | |
|---|---|---|---|
| 3,265,813 A | | 8/1966 | McFarlane et al. |
| 4,631,486 A | * | 12/1986 | Snell ........................... 329/304 |
| 4,989,220 A | * | 1/1991 | Serrone ....................... 375/329 |
| 5,255,086 A | | 10/1993 | McMullan, Jr. et al. |
| 5,347,228 A | * | 9/1994 | Iwasaki ....................... 329/308 |
| 6,601,213 B1 | | 7/2003 | Uchiki et al. |
| 2004/0151237 A1 | * | 8/2004 | Ferry et al. ................. 375/219 |

FOREIGN PATENT DOCUMENTS

| | | |
|---|---|---|
| JP | 46-002690 | 1/1971 |
| JP | 2000-358016 | 12/2000 |
| WO | WO 03079624 A1 * | 9/2003 |

OTHER PUBLICATIONS

Universidad de Barcelona, "RF activities at SIC", 2003.*
Rategh, "Superharmonic injection locked oscillators as low power frequency dividers", 1998 Symposium on VLSI Circuits, 1998, Digest of Technical Papers, Jun. 11-13, 1998 pp. 132-135.*

(Continued)

*Primary Examiner*—Juan A Torres
(74) *Attorney, Agent, or Firm*—Harness, Dickey & Pierce, P.L.C.

(57) ABSTRACT

A system for the coherent demodulation of Binary Phase Shift keying (BPSK) signal at a frequency f, includes recovering a carrier signal (C) at a frequency 2f from the BPSK signal; injecting the signal having a frequency 2f in an injection locking oscillator (ILO), which has a natural resonant frequency $f_r$ which is substantially equal to f, to provide differential output ($O_p$, $O_n$) signals which recover the original carrier with a phase shift of $(\theta_e - k)/2$, where $\theta_e = \arcsin((f_r - f)/(\alpha A_r f))$ where $\alpha$ and k are parameters that depend on the type of predominant non-linearity in the injection locking oscillator (ILO), and $A_r$ is the amplitude of the recovered carrier signal at a frequency of 2f, and combining the differential output ($O_p$, $O_n$) signals with a copy of the incoming BPSK signal to generate a demodulated signal (DEMOD).

5 Claims, 6 Drawing Sheets

OTHER PUBLICATIONS

Lasri, "Phase dynamics of a timing extraction system based on an optically injection-locked self-oscillating bipolar heterojunction phototransistor", Journal of Lightwave Technology, vol. 20, Issue 11, Nov. 2002 pp. 1924-1932.*

Wei-Zen Chen, "18 GHz and 7 GHz superharmonic injection-locked dividers in 0.25μm CMOS technology", Proceedings of the 28th European Solid-State Circuits Conference, 2002, ESSCIRC 2002, Sep. 24-26, 2002 pp. 89-92.*

Jinho Jeong, "V-band harmonic injection-locked frequency divider using cross-coupled FETs", Microwave and Wireless Components Letters, IEEE vol. 14, Issue 10, Oct. 2004 pp. 457-459.*

Rategh, "Superharmonic injection-locked frequency dividers", IEEE Journal of Solid-State Circuits, vol. 34, Issue 6, Jun. 1999 pp. 813-821.*

European Search Report.

J.M. Lopez-Villegas, et al., "BPSK to ASK Converter for RF Digital Communications", IFTU-82, IEEE MTT-S Digest, pp. A129-A-132 (2003).

C.L. Ruthroff, "Injection-Locked-Oscillator FM Receiver Analysis", XP008052118 Manuscript, pp. 1653-1661 (1968).

* cited by examiner

State of the art

Carrier recovery

State of the art

Carrier Recovery

State of the art

SYSTEM FOR COHERENT DEMODULATION OF BINARY PHASE SHIFT KEYING SIGNALS (BPSK)

FIELD OF THE INVENTION

The invention relates to a system for the demodulation of Binary Phase Shift Keying signals (BPSK).

The general application fields of the invention are digital communications, particularly wireless digital communications.

BACKGROUND OF THE INVENTION

The digital phase shift keying of a sinusoidal signal (PSK) is one of the most efficient modulation techniques, both in terms of noise immunity and required bandwidth. Nevertheless, the demodulation of PSK signals requires complex demodulator systems. Therefore, other less efficient digital modulation schemes are usually preferred because of their simpler demodulation, for instance Frequency Shift Keying (FSK) or Amplitude Shift Keying (ASK).

The simplest PSK signal is the Binary PSK signal (BPSK). In this case, the carrier phase is shifted between two possible states, 0° and 80°, according to the bit stream. BPSK signals can be easily obtained by multiplying the carrier by +1 (0° phase state) or by −1 (180° phase state). From the receiver point of view, it is impossible to know if the phase of an incoming BPSK signal corresponds to 0° states or to 180° state. This is due to the fact that the actual propagation path from the emitter to the receiver is usually unknown. To avoid this indetermination, the information to be transmitted is coded as transitions between phase states, instead of being coded as fixed phase values. Therefore, when logic "1" has to be transmitted then the phase of the carrier signal is shifted, whereas the phase is unchanged for logic "0", or vice versa. The signal coded in this way is known as Differential BPSK (DBPSK). It should be noted that from the signal point of view there is no difference between BPSK and DBPSK. The only difference between them is the pre-processing (at the transmitter side) or post-processing (at the receiver side) of the base-band signal. FIG. 1 shows the generation of a BPSK or DBPSK signal as the product of the Base-band signal (derived from the bit stream or from the processed bit stream) and the sinusoidal carrier at the desired frequency.

The usual procedure for demodulating BPSK signals is that of coherent demodulation. Basically, the demodulation process consists of multiplying the received signal by a reference signal at the same frequency as the original carrier.

Mathematically, the BPSK signal can be expressed by:

$$BPSK = \pm A \cos(wt+\psi) \quad (1)$$

Where the + sign corresponds to the 0° phase state and the − sign to the 180° phase state. A is the amplitude of the received signal, and $\psi$ is the arbitrary phase due to signal propagation.

The reference signal, S, is given by (the amplitude is set to 1 for simplicity):

$$S = \cos(wt) \quad (2)$$

The product, P, can be expressed as follow:

$$P = \pm A \cos(wt+\psi) \cdot \cos(wt) = \pm A/2 \cos(\psi) \pm A/2 \cos(2wt+\psi) \quad (3)$$

Finally, by low pass filtering P, the following base band term is obtained:

$$P_{LPF} = \pm A/2 \cos(\psi) \quad (4)$$

The result is a signal, $P_{LPF}$, which reproduces the original modulation (±). From (4), if the propagation phase $\psi$ is 0° or 180°, the efficiency of the demodulation process reach its maximum (regardless of the phase indetermination). On the contrary, if $\psi = +90°$, the efficiency of the demodulation process is null. This fact points out the first drawback of the coherent demodulation of PSK signals, which is the propagation phase uncertainty. The second, and most important, is the availability of a reference signal at exactly the same frequency as the original carrier.

The usual way to overcome both problems is by using a carrier recovery circuit. Carrier recovery is accomplished by using synchronization loops. The most widely used are the squaring loop and the Costas loop, which characteristics and operation are depicted in FIGS. 2 and 3, respectively.

As shown in FIG. 2, the squaring loop consist of a squaring block and a Band Pass Filter (BPF), which from the BPSK input signal generates a reference signal at twice the frequency of the original carrier and, ideally, without any phase modulation. A Phase-Locked Loop (PLL), consisting of a phase/frequency detector, a loop filter and a Voltage Controlled Oscillator (VCO), is used to recover the carrier at twice the frequency. The original carrier is finally recovered using a divide by 2 frequency divider. Demodulation is accomplished by multiplying the recovered carrier by the incoming BPSK signal.

The Costas loop circuit consists of two mixers, which produce the product of the incoming signal with two reference quadrature signals (0°/90°). A third mixer, acting as phase detector, generates an error signal as the product of the low pass filtered outputs of both previous mixers. Finally, the error signal is passed through a loop filter (i.e. an integrator) to generate the control signal of the Voltage Controlled Oscillator (VCO) which, when combined with the 90° phase shifter, generates the reference quadrature signals, and closes the loop. The error signal will be zero when the frequency of the reference quadrature signals is equal to the frequency of the original carrier. Moreover, the VCO output reference signal (in-phase signal) will have either the same propagation phase of the carrier, $\psi$, or differ from it by 180°. In the locking state, that is to say when the error function is zero, the Costas Loop acts as a demodulator of BPSK signals. In fact, the base band modulator signal (regardless of sign uncertainty) is found at the output of the first low pass filter (LPF1 in FIG. 3).

The main advantage of the coherent demodulation performed by both previous schemes is the tracking of the input signal. This allows the correction of frequency deviations, for instance those due to relative movement between emitter and receiver in a mobile system. Moreover, no previous information about the modulating signal is required (i.e. the bit period). However, synchronization time is usually large, leading to loss of data at the beginning of a communication or malfunctioning in burst mode transmissions. Another important drawback of the synchronization loops is the need of loop filters, which are hard to implement in monolithic form.

In the way of an example, U.S. Pat. No. 5,347,228 employs the coherent demodulation procedure, which is based on the Costas Loop (as shown in FIG. 3), and complemented by a series of additional components for detecting the demodulator tuning status (phase tuning and correct demodulation of the input signal), or the pseudo-tuning status (incorrect modulation).

U.S. Pat. No. 4,631,486 proposes an alternative procedure to achieve a phase reference which permits demodulation. In this case a certain average of the received phasors is carried out, from which a phase reference estimate is obtained. Each received phasor is compared with the reference to demodulate the signal and is then used to refine the phase reference estimate. This procedure possesses the advantage of being able to correctly demodulate signals received in a discontinuous fashion, without loss of information associated with the tuning time. Its inconvenience is the greater complexity of the demodulator system and the implicit requirement to know the modulating signal bit period in order to perform phasor averaging.

Another possible demodulation procedure for signals employing digital phase modulation is the proposal in U.S. Pat. No. 4,989,220. This method is applicable to digital phase modulated signals which only involve changes between adjacent phase states. Basically, the operating principle consists of multiplying the signal received at a time period with the signal received in a previous time period. The time difference is obtained through the use of a delay component and is adjusted so that it is equal to the bit time. The result of this multiplication is filtered by a low pass filter in order to produce the DC component of the resultant signal. Only when there are phase changes in a bit period will there be a change in the value of the DC component. In this case, demodulation is carried out directly, synchronization not being required. The basic disadvantage is that the modulating signal bit period must be known beforehand.

SUMMARY OF THE INVENTION

With respect to the stated background, this invention presents the advantages corresponding to coherent demodulation (input signal tracking and demodulation process which is independent of the modulating signal bit period), but without the requirement for the explicit use of a frequency and phase-locking loop (PLL or Costas loop). The basic operating principle of the invention is the locking of resonant circuits by super harmonic injection to recover the carrier of the BPSK signal. This way, the carrier recovery is accomplished by means of super harmonic injection locking of an oscillator, without the need of external feedback path. As a consequence, no loop filter is required and then the resulting architecture is suitable for monolithic integration.

A first aspect of the invention relates to a system for the coherent demodulation of BPSK signals, said Binary Phase Shift Keying BPSK signal having a frequency f, the system for demodulation comprising means for recovering a carrier signal (C) at a frequency 2f from said BPSK signal, means for injecting said signal having a frequency 2f in an injection locking oscillator ILO, which has a natural resonant frequency $f_r$, being $f_r$ substantially equal to f, which provides with differential output $O_p$, $O_n$ signals which recover the original carrier with a phase shift of $(\theta_e-k)/2$, where $$\theta_e = \arcsin\left(\frac{f_r - f}{\alpha A_i f}\right)$$

where $\alpha$ and k are parameters that depend on the type of predominant non-linearity in the injection locking oscillator ILO, and $A_i$ is the amplitude of the recovered carrier signal at a frequency of 2f, and means for combining the differential output $O_p$, $O_n$ signals with a copy of the incoming BPSK signal in order to generate a demodulated signal (DEMOD).

Should $f_r$ not be substantially equal to f, the yield of the coherent demodulator will be less than in the case where $f_r \approx f$, but the demodulator will also work.

The operational principle of the invention is the locking phenomenon of both frequency and phase of the injection locking oscillator ILO, or argument divide-by-two circuit, when injected with a signal having a frequency close to the second harmonic of its natural resonant frequency $f_r$. According to what has been established and verified by the inventors, this argument locking phenomenon (frequency and phase) is due to the non-linear response, which the components used in the ILO circuit present to a greater or lesser extent.

The following may be pointed out as the more common sources of non-linearity:

a) the variations of capacity of the varactor diodes with the applied bias voltage in the case where these components are employed.

b) the variations in capacity in bipolar transistor base-emitter and base-collector unions in the case where these components are employed.

c) the variations in capacity in MOSFET transistor gate-source, gate-drain and gate-substrate in the case where these components are employed.

d) In MOSFET transistors, drain currents and in bipolar transistor base-collector currents depend from the polarizing voltage according a square or higher order law.

Non-linearity is responsible for harmonic mixing, which then produces new spectral components. When the ILO is injected with a signal having a frequency 2f, which is close to $2f_r$ (where $f_r$ is the ILO natural resonant frequency), the non-linearity (particularly those of the second order) lead to an additional contribution (of voltage and/or current) to the frequency $2f-f_r \approx f_r$. This contribution is added to that already existing at the same frequency, so that ILO resonance characteristics are modified. It is demonstrated both analytically and experimentally, that the change in ILO operating conditions can be expressed as a variation, $\Delta f_r$, of its resonant frequency, which is given by:

$$\Delta f_r = \alpha A_i f \sin(\theta) \tag{5}$$

where $\alpha$ is a parameter which depends on the type of predominant non-linearity, $A_i$ is the amplitude of the input signal at a frequency of 2f and angle $\theta$ is expressed as:

$$\theta = 2\phi(t) - \varphi + k \tag{6}$$

where $\varphi$ and $\phi(t)$ are the input and output signal phases respectively, and t is the time. The value of k also depends on the non-linearity which is predominant in the circuit, for example, k=0 if the non-linearity is due to a current which is variable with the bias voltage and k=π/2 if the non-linearity is attributable to a variable capacity.

Additionally, the $O_p$ and $O_n$ outputs from the ILO, can be expressed as:

$$O_p = B\cos(2\pi f t + \phi(t)); \quad O_n = O_p + \pi \tag{7}$$

where B is the amplitude of the output signal and $\phi(t)$ verifies:

$$\Delta f_r = \frac{1}{2\pi}\frac{d}{dt}(2\pi f t + \varphi(t)) - f_r = (f - f_r) + \frac{1}{2\pi}\frac{d\varphi}{dt} \tag{8}$$

Combining (5) and (6) with (8) the differential equation which governs the ILO dynamic response to the injected input signal is obtained. The balanced state (lock-in state) is achieved when $d\phi/dt=0$; or the same thing said in a different way, when the output signal frequency is exactly half the input signal frequency and therefore $\Delta f_r = f - f_r$.

By substituting this condition in (5), two possible values of balance are obtained for angle $\theta$, which may be expressed as follows:

$$\theta_e = \arcsin\left(\frac{f_r - f}{\alpha A_i f}\right) \text{ and } \theta_m = \pi - \theta_e \quad (9)$$

It has been shown that the first possibility, $\theta_e$, corresponds to a stable balance situation, whereas the second, $\theta_m$, is a meta-stable balance situation. The stable balance angle $\theta_e$ will be short provided that the input signal has a frequency close to twice the natural resonant frequency of the ILO.

From (6) it can be deduced that the locking condition is not unique for an output phase, $\phi$, and that there is a $\pi$ radians uncertainty, which is nothing more than a mathematical consequence of the argument divide-by-two performed by the ILO circuit.

The means for combining the differential output $O_p$, $O_n$ signals with a copy of the incoming BPSK signal may comprise means for multiplying $\text{Mix}_1$, $\text{Mix}_2$ the differential output signals $O_p$, $O_n$ of the injection locking oscillator ILO, with signals $i_1$, $i_3$ which are copy of the incoming BPSK signal, and have the same frequency and very similar amplitudes and phases, which provide with output $\text{IF}_1$, $\text{IF}_2$ signals respectively, means for low-pass filtering $\text{LPF}_1$, $\text{LPF}_2$ said outputs $\text{IF}_1$, $\text{IF}_2$ signals to produce base band-signals $BB_p$, $BB_n$, respectively, means of subtracting the base-band signals to generate a demodulated signal DEMOD.

The means for recovering a carrier signal C having a frequency 2f preferably include a squaring circuit.

The system for demodulation preferably comprises a bandpass filter block connected between the squaring circuit block and the injection locking oscillator (ILO).

The generic BPSK signal at frequency f, which may be expressed as:

$$\text{BPSK} = \pm A \cos(2\pi f t + \psi) \quad (10)$$

is squared and band-pass filtered to obtain the carrier, C, at frequency 2f, which is given by:

$$C = \frac{A^2}{2}\cos(4\pi \text{ft} + 2\psi) \quad (11)$$

Taking into account expression (6) and replacing $\phi$ by $2\psi$, it can be obtained the following relationship in the lock-in state between the phase, $\phi_e$, of ILO's output $O_p$ and the phase, $\psi$, of the input BPSK signal:

$$\phi_e = \psi + (\theta_e - k)/2 + n\pi; n = 0, 1, 2 \quad (12)$$

That is, the ILO output $O_p$ (similarly $O_n$) recovers the original carrier with a phase shift of $(\theta_e - k)/2$ and a phase uncertainty of $\pi$.

According to the phase relationship of (12), at the outputs $\text{IF}_1$ and $\text{IF}_2$ of $\text{Mix}_1$ and $\text{Mix}_2$, one can obtain:

$$IF_1 = \pm AB \cos(2\pi f t + \psi) \cdot \cos(2\pi f t + \phi_e) \quad (13)$$

$$IF_2 = \pm AB \cos(2\pi f t + \psi) \cdot \cos(2\pi f t + \phi_e + \pi) \quad (14)$$

and after low-pass filtering:

$$BB_p = \pm AB/2 \cos[(\theta_e - k)/2 + n\pi] \quad (15)$$

$$BB_n = \pm AB/2 \cos[(\theta_e - k)/2 + (n+1)\pi] \quad (16)$$

It should be noted that either $BB_p$ or $BB_n$ are bi-valued signals (complementary one to each other) the sign changes of which already reproduce the phase changes of the input BPSK signal. However, due to mismatches or asymmetries these signals can be affected by common-mode offsets which can affect the normal operation of following stages (i.e. saturate base band amplifiers or signal regenerators). To avoid this problem, both signals are subtracted to generate the final demodulated output DEMOD, which can be expressed as:

$$\text{DEMOD} = \pm AB \cos[(\theta_e - k)/2 + n\pi] \quad (17)$$

The maximum efficiency of the demodulation process corresponds to the case $\theta_e = k$. Under these conditions $\text{DEMOD} = \pm AB \cdot (\pm 1)$.

Depending on the predominant non-linearity we can distinguish two different cases:

a) Non Linear Current ($k = 0$).

In this case the maximum efficiency of the demodulation process is achieved when $\theta_e = 0$. From (9) this corresponds to $f = f_r$, which is also the condition for maximum sensitivity of the locking process (i.e. minimum injected power is required to phase lock the ILO).

b) Non Linear Capacitance ($k = \pi/2$).

Maximum efficiency is now achieved when $\theta e = \pi/2$. However, according to (9) this corresponds to frequencies f and $f_r$ which are in the locking limit, that is to say $(f_r - f)/(\alpha A_i f) = 1$. Any deviation from its initial value of the natural resonant frequency $f_r$, for instance due to noise or drift in the component characteristics, will cause locking to vanish. If instead of maximum demodulation efficiency we look for maximum locking sensitivity (i.e. $\theta_e = 0$) then $\text{DEMOD} = \pm AB \cdot (\pm \sqrt{2}/2)$, that is to say, 70% of the maximum efficiency. Accordingly, either a trade off between maximum demodulation efficiency and maximum locking sensitivity have to be established, or a delay path is included to compensate for the phase deviation for optimum locking and optimum demodulation. The delay block can be placed anywhere in the chain from $i_2$ to C, in FIG. 4, or simultaneously in $i_1$ and $i_3$ paths. In the first case the delay path has to produce a phase shift of $\pi/2$ (half this value if connected before the squaring stage) and in the second case $-\pi/2$.

A second aspect of the invention relates to a method for the coherent demodulation of BPSK signals at a frequency f, based on the synchronisation of an oscillator by means of injection of a signal having a frequency of 2f.

The oscillator is synchronised when injected with a signal having a frequency of 2f, and being the natural resonant frequency $f_r$ of the oscillator substantially equal to f.

The method for the coherent demodulation of BPSK signals at a frequency f, comprises:

recovering a carrier signal (C) at a frequency 2f from said BPSK signal, injecting said signal having a frequency 2f in an injection locking oscillator (ILO), in order to recover the original carrier with a phase shift of $(\theta_e - k)/2$, where $$\theta_e = \arcsin\left(\frac{f_r - f}{\alpha A_i f}\right)$$

where α and k are parameters that depend on the type of predominant non-linearity in the injection locking oscillator (ILO), and $A_t$ is the amplitude of the recovered carrier signal at a frequency of 2f, and combining the differential output ($O_p$, $O_n$) signals with the incoming BPSK signal in order to generate a demodulated signal (DEMOD).

SHORT DESCRIPTION OF THE DRAWINGS

DETAILED DESCRIPTION OF THE DRAWINGS

Figure 1:
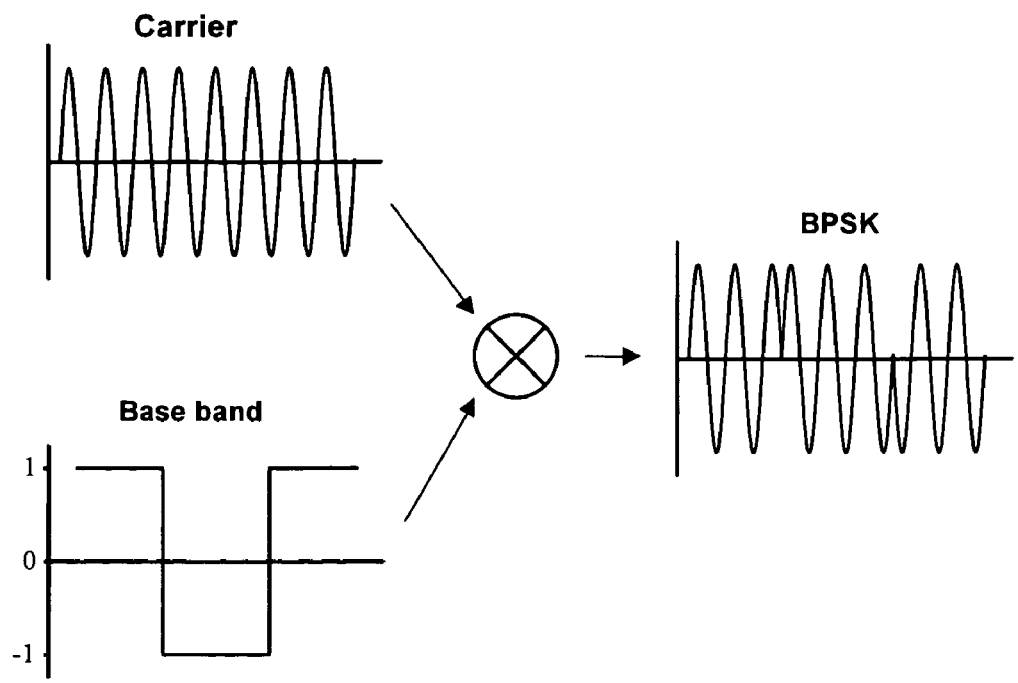
FIG. 1 is a diagrammatic representation of the generation of a BPSK signal.
Figure 2:
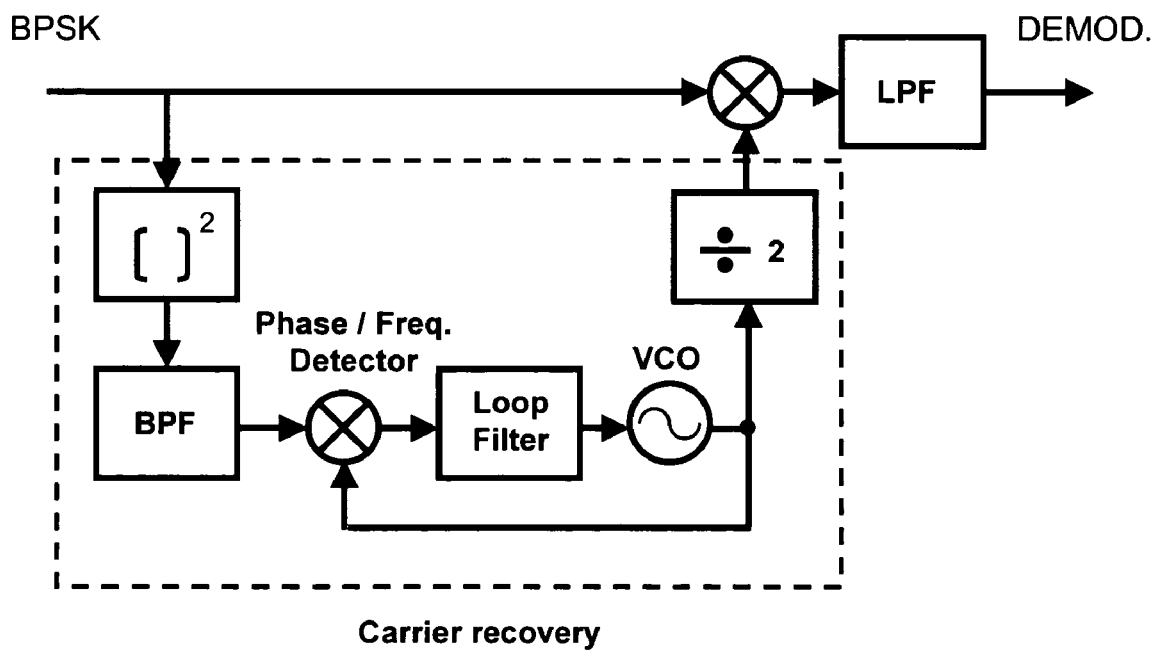
FIG. 2 shows a diagram of the squaring Loop.
Figure 3:
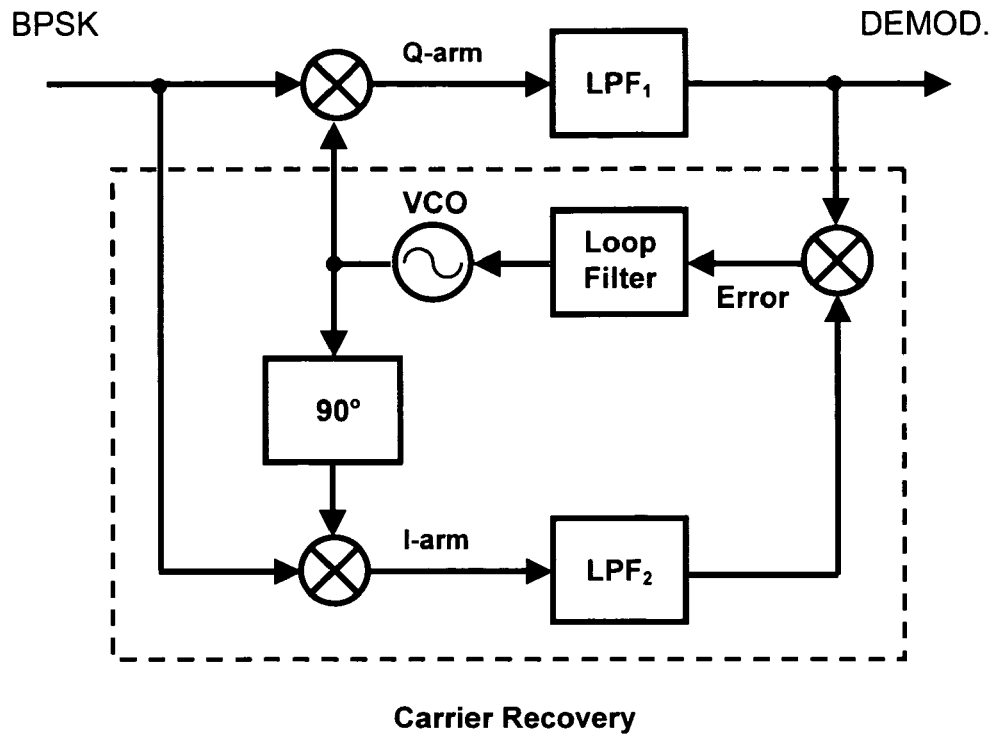
FIG. 3 shows a diagram of a Costas Loop.
Figure 4:
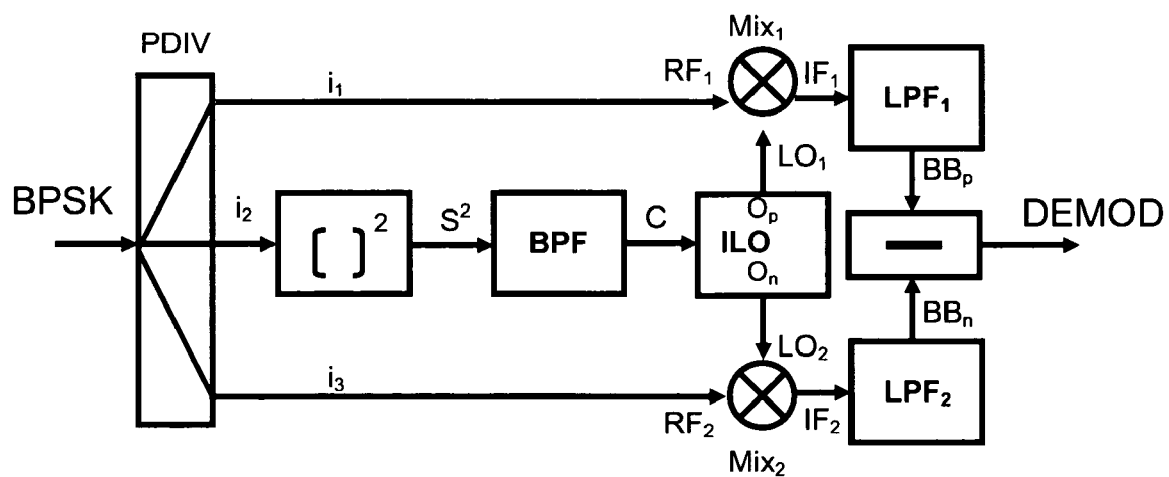
FIG. 4 shows a diagram of a preferred BPSK demodulator according to the present invention.

The present invention refers to a system for the demodulation of Binary Digital Phase Shift Keying signals (BPSK). FIG. 4 shows one possible version of the demodulator system, which can be divided into the following sections:

(a) A power divider PDIV, whose input is the BPSK phase modulation signal at a frequency f, where f is the frequency of the carrier signal. This power divider provides at its output signals $i_1$, $i_2$ and $i_3$, with the same frequency f as the input signal. In addition, $i_1$ and $i_3$ are of equal amplitude and in the same phase state, which may be the same as the input signal or with a certain phase imbalance or delay that is the same for both. The amplitude and phase state of signal $i_2$ may be the same of signals $i_1$ and $i_3$, or with a certain amplitude and/or phase imbalance. This power divider may be either passive or active.

(b) A squaring circuit block, which can be implemented using any active or passive circuit having a quadratic term in the transfer function from input to output. Examples of these circuits are the full wave diode rectifier or a mixer working as analogue multiplier.

(c) A band pass filter (BPF), if required, to select the proper component at frequency 2f from the output of the squaring block.

(d) An Injection Locked Oscillator (ILO) acting as a divide-by-two analogue argument divider, which natural resonant frequency is $f_r$ (in the absence of an injected signal). This ILO provides the differential output signals, $O_p$ and $O_n$ at frequency f. The differential output phase is fixed by signal C at frequency 2f, according to expression (6).

(e) Two Mixers, $Mix_1$ and $Mix_2$, active or passive, combined with low pass filters $LPF_1$ and $LPF_2$ to downconvert the BPSK input signal into Base band signals $BB_p$ and $BB_n$.

(f) A subtractor, either passive or active, which generates the DEMOD output from the base band signals $BB_p$ and $BB_n$.

Figure 5:
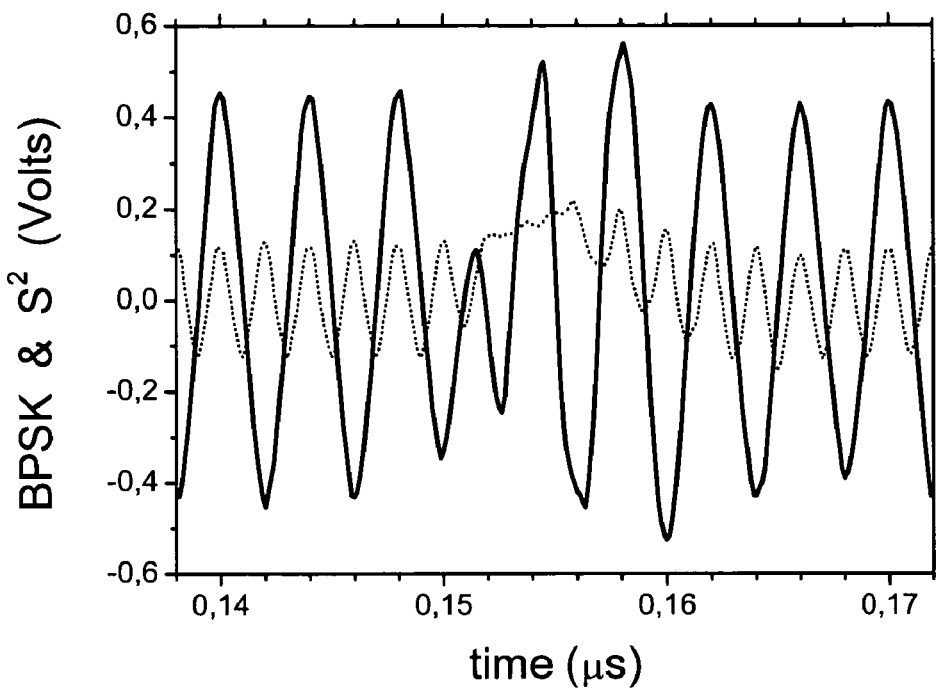
FIG. 5 shows the measured time domain waveforms of the BPSK signal at frequency f and the $S^2$ signal at frequency 2f.

FIG. 5 shows the time relationship between the measured BPSK input signal and the output signal $S^2$ of the squaring block. In this case a commercial frequency doubler circuit has been used to generate $S^2$ signal.

Figure 6:
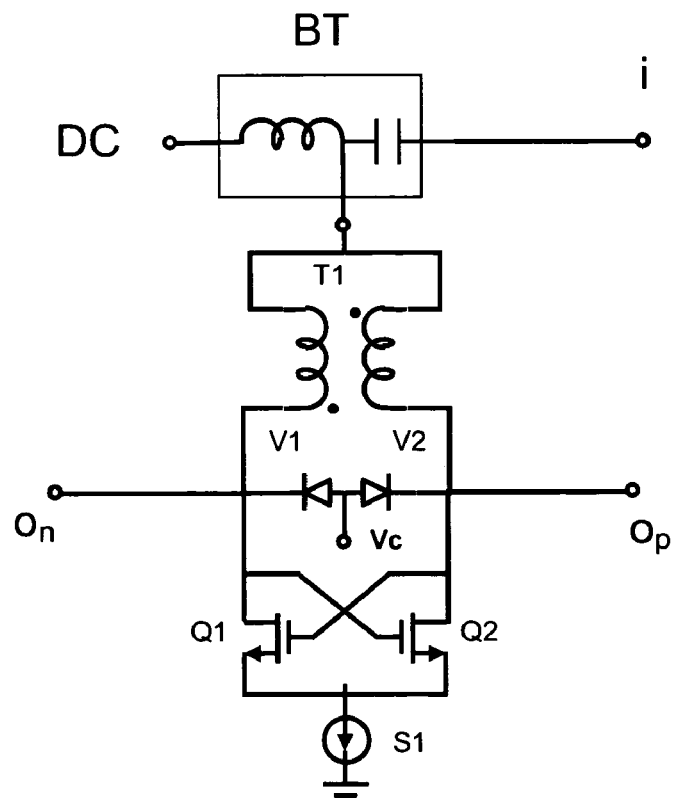
FIG. 6 shows a preferential implementation of the injection locking oscillator (ILO), using non linear varactor diodes.

The injection-locked oscillator (ILO) of FIG. 4 can be implemented in several ways. FIG. 6 contains a preferential, but not exclusive, implementation of the ILO circuit. The principle on which the frequency division process is based, as has already been stated, is the frequency and phase locking phenomenon of a resonant circuit when it is injected with a signal having a frequency close to the second harmonic of its fundamental frequency. The circuit consists of the following sections:

(a) A bias-T circuit, BT, the purpose of which is to combine the injected signal (i) at a frequency of 2f with the continuous DC bias required for resonant circuit operation.

(b) An inverter transformer, T1, with primary and secondary windings connected at one end to the bias network output and the other to the varactor diodes, V1 and V2.

(c) The described varactor diodes V1 and V2, the anodes of which are connected to a control voltage Vc.

(d) Two cross-coupled transistors Q1 and Q2.

(e) Differential outputs $O_p$ and $O_n$.

(f) A current source S1 to guarantee correct transistor polarisation.

It is important to note that the frequency/phase locking process, which is a characteristic of this type of divider circuit, is much faster than that associated with the Squaring or Costas Loops, because it is intrinsic to the actual components and not to the locking circuit as a whole.

The transformer and the two varactor diodes form a resonant tank circuit, the resonant frequency of which is fixed by the value of control voltage Vc. These varactor diodes may be replaced by fixed value capacitors, in which case the possibility to control the resonant frequency is lost. The purpose of the cross-coupled transistor pair (these are MOSFET in FIG. 6, but they could be bipolar) is to provide sufficient gain in order to compensate the resonant tank circuit losses and to generate a constant amplitude oscillation at the resonant frequency $f_r$. When the injected signal has sufficient power, the tank's resonant characteristics change. This is due to the non-linear behaviour in the varactor diode response and/or the amplifier stage transistors. The new resonant frequency is tuned to half that of the injected signal and the phase is adjusted to either of the two possible values, with a 180° difference.

Figure 7:
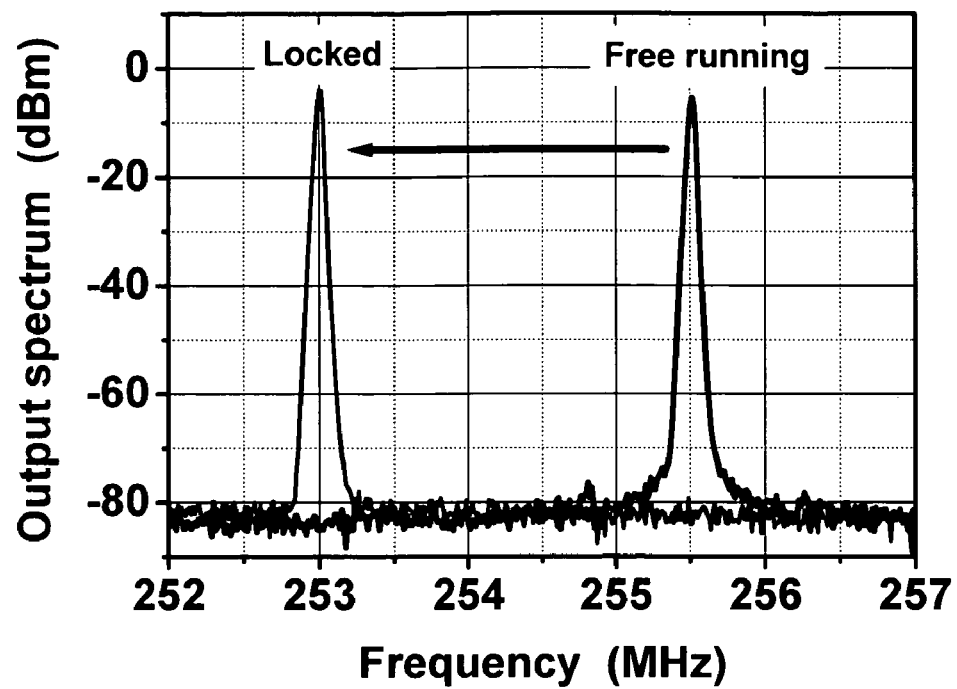
FIG. 7 shows the measured spectra of one of the outputs ($O_p$ or $O_n$) of the ILO, before injection of the input signal C, at 2f, (free running) and in the lock-in state (locked).

FIG. 7 shows the measured spectra of one of the ILO's output ($O_p$ or $O_n$), before injection (free running) and in the lock-in state (locked) after injection of the input signal at a frequency of 506 MHz. Note that the natural frequency of 255.5 MHz is shifted in −2.5 MHz by locking.

Figure 8:
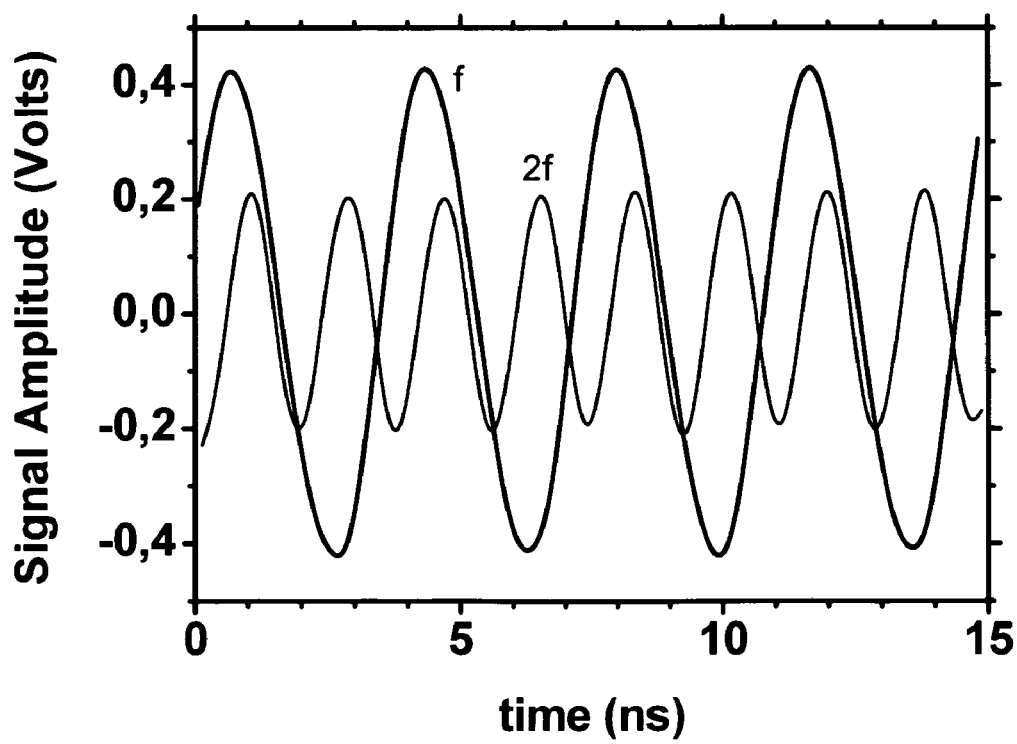
FIG. 8 shows the measured time domain waveforms of the ILO input waveform C of the ILO, at 2f, and one of the outputs ($O_p$ or $O_n$) of the ILO at f.

FIG. 8 shows the measured time domain waveforms of the ILO's input waveform C, at 2f, and one of the ILO's output ($O_p$ or $O_n$) at f. It should be noted the phase relationship in the lock-in state between the fundamental oscillation at f and the $2^{nd}$ harmonic at 2f.

Figure 9:
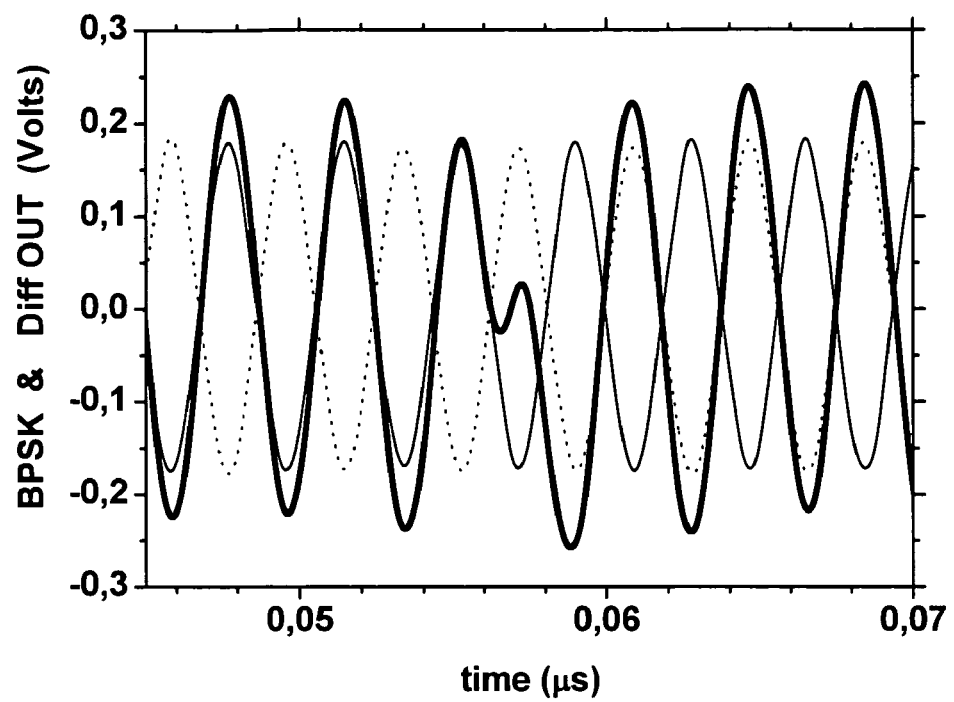
FIG. 9 shows the measured time domain waveforms of the BPSK signal and the differential output of the ILO, Op (-) and On ( . . . ), all at frequency f.

FIG. 9 shows the measured time domain waveforms of the BPSK signal and the ILO's differential output, $O_p$ (-) and $O_n$ ( . . . ), all at frequency f. Note that the BPSK signal is in phase with the $O_p$ output prior to the 180° phase change, and in phase with the $O_n$ output afterwards.

Figure 10:
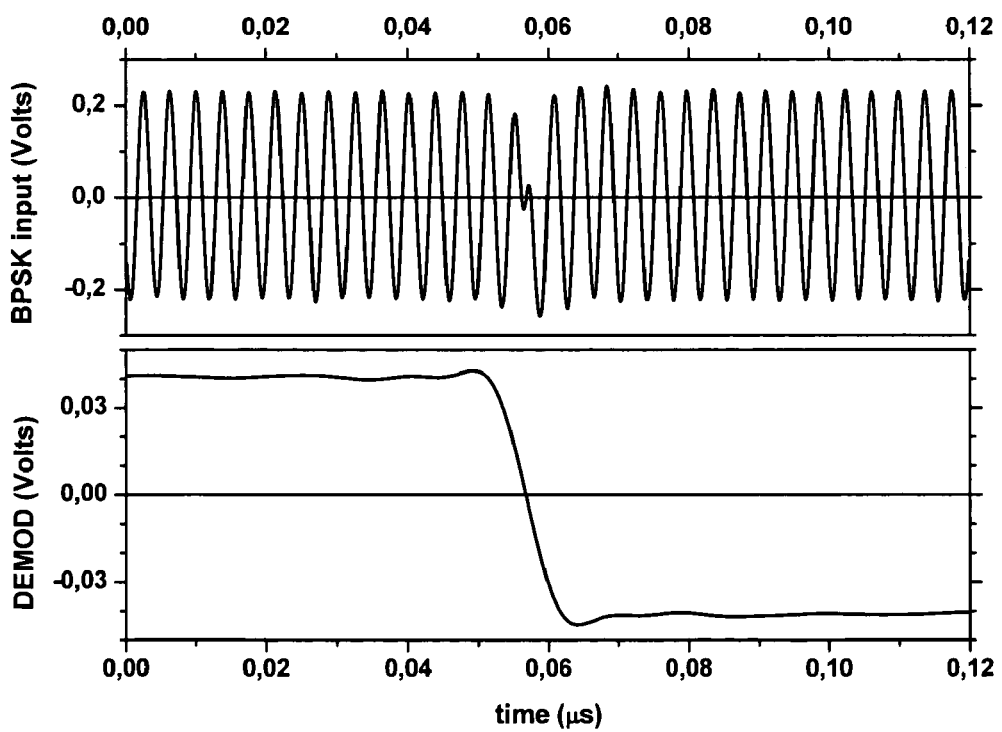
FIG. 10 shows the BPSK input signal together with the demodulated output, DEMOD.

FIG. 10 shows the BPSK input signal together with the demodulated output, DEMOD. In the case shown in the figure the fall time of the DEMOD signal is about 15-20 ns, which implies a maximum demodulation rate of about 50-60 Mbits/s.

Figure 11:
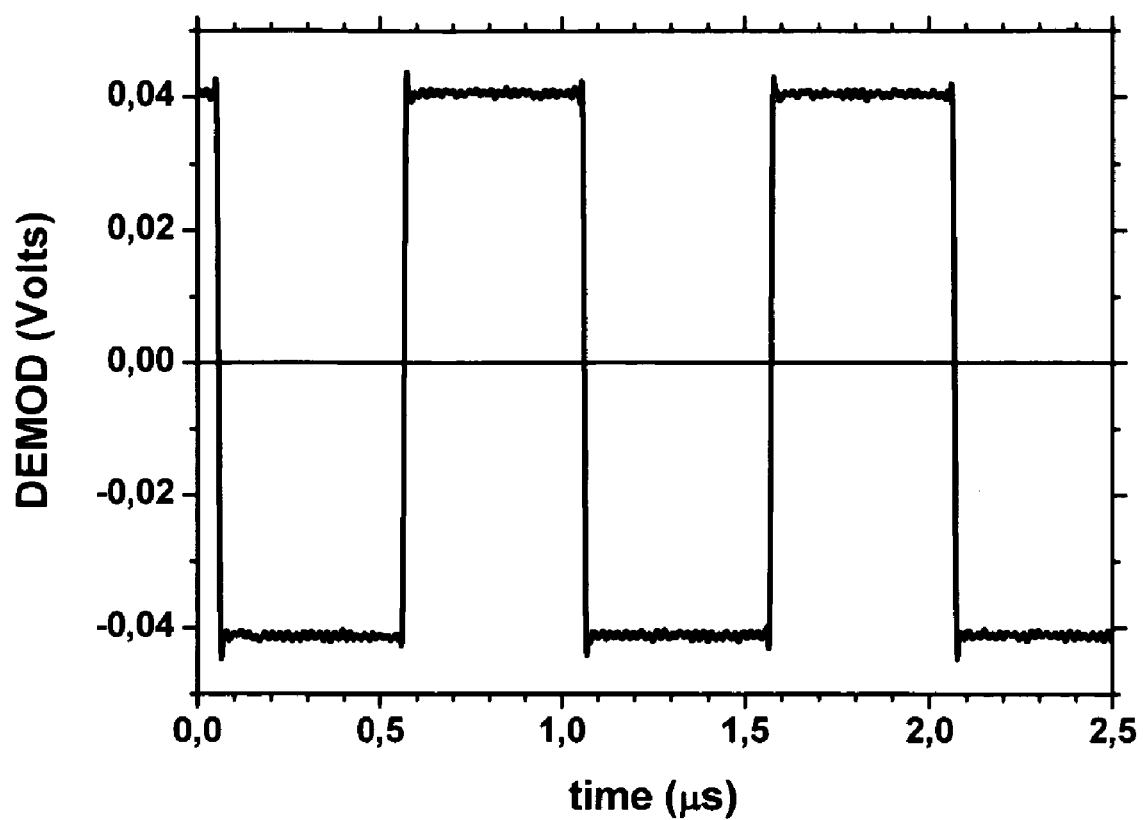
FIG. 11 shows the DEMOD output corresponding to a BPSK input signal changing its phase in 180° every 500 ns.

FIG. 11 shows the DEMOD output corresponding to a BPSK input signal changing its phase in 180° every 500 ns.

The invention claimed is:

1. An apparatus for the coherent demodulation of a Binary Phase Shift Keying BPSK signal having a frequency f, comprising:

means for recovering a carrier signal (C) having a frequency 2f from said BPSK signal, means for injecting said carrier signal having a frequency 2f in an injection locking oscillator (ILO), which has a natural resonant frequency $f_r$ which is substantially equal to f, said injection locking oscillator providing differential output signals ($O_p$, $O_n$) having a phase difference of $\pi$ rad, which the original carrier with a phase shift of $(\theta_e-k)/2$, where $$\theta_e = \arcsin\left(\frac{f_r - f}{\alpha A_i f}\right)$$

where $\alpha$ and k are parameters that depend on the type of predominant non-linearity in the injection locking oscillator (ILO), and $A_i$ is the amplitude of the recovered carrier signal at a frequency of 2f, and means for combining the differential output signals ($O_p$, $O_n$) with copies of the incoming BPSK signal in order to generate a demodulated signal (DEMOD).

2. The apparatus for demodulation according to claim 1, wherein the means for combining the differential output signals ($O_p$, $O_n$) with the copies of the incoming BPSK signal comprises:

means for multiplying ($Mix_1$, $Mix_2$) the differential output signals ($O_p$, $O_n$) of the injection locking oscillator (ILO), with two signals ($i_1$, $i_3$) which are copies of the incoming BPSK signal and have the same frequency and are of equal amplitude and in the same phase state, which may be the same as the input signal or with a certain phase imbalance or delay that is the same for both, and providing output signals ($IF_1$, $IF_2$), means for low-pass filtering ($LPF_1$, $LPF_2$) said output signals ($IF_1$, $IF_2$) to produce base-band signals ($BB_p$, $BB_n$), and means for subtracting the base-band signals to generate a demodulated signal (DEMOD).

3. The apparatus for demodulation according to claim 1, wherein the means for recovering a carrier signal (C) having a frequency 2f include a squaring circuit.

4. The apparatus for demodulation according to claim 3, which further comprises a band-pass filter block connected between the squaring circuit block and the injection locking oscillator (ILO).

5. The apparatus for demodulation according to claim 2, wherein the means for multiplying ($Mix_1$, $Mix_2$) are the same.

* * * * *